June 27, 1933.  L. B. GREEN  1,915,822
ELECTROMAGNETIC FLUID CONTROL VALVE
Filed June 30, 1932
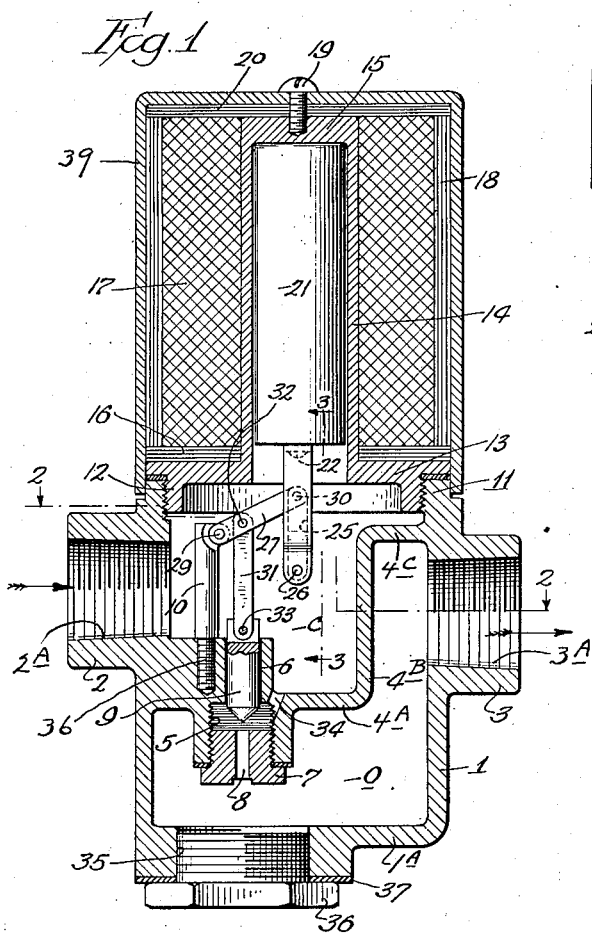
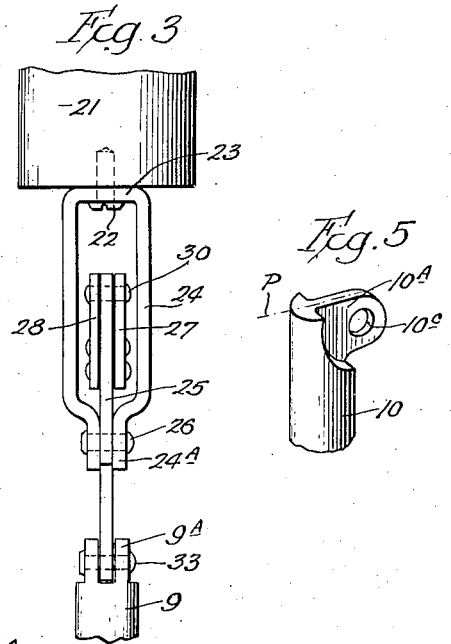
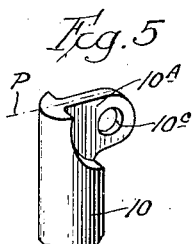
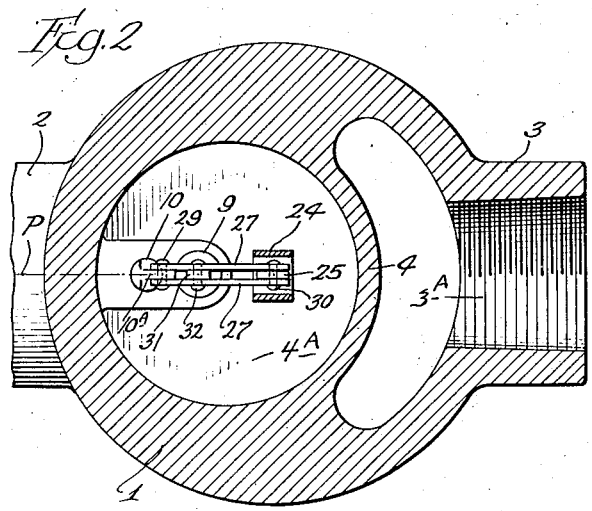
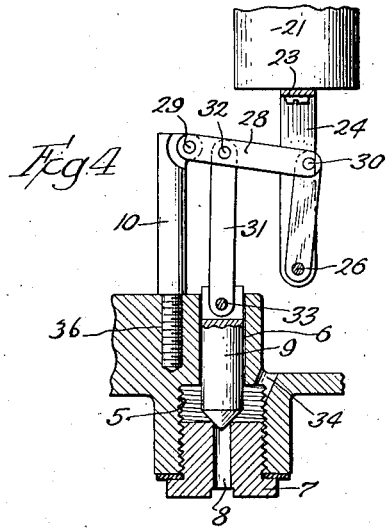
Inventor:
Lee B. Green
by Albert Scheible
Attorney Patented June 27, 1933

1,915,822

UNITED STATES PATENT OFFICE

LEE B. GREEN, OF LAKEWOOD, OHIO, ASSIGNOR TO THE GLOBE MACHINE & STAMPING COMPANY, OF CLEVELAND, OHIO, A CORPORATION OF OHIO

ELECTROMAGNETIC FLUID CONTROL VALVE

Application filed June 30, 1932. Serial No. 620,174.

My invention relates to the class of electromagnetic fluid-control valves in which a movable valve member is lifted off its seat by the core of a solenoid when the valve is opened, and in which the weight of this core is utilized for holding the movable valve member firmly against the valve seat when no current is flowing through the coil of the solenoid.

With electromagnetic valves of this class, the following difficulties are commonly encountered, particularly when considerations of both space and cost demand the use of a relatively light solenoid core, and when the coil of the solenoid is also constructed so as to keep its current consumption:

When such a valve is used in connection with fluid under any considerable pressure, the weight of the solenoid core if directly connected to the valve member (as by having an axial extension of this core serve as the valve member) often is not sufficient to hold this valve member firmly seated in the closed position of that member. Moreover, when the seat becomes worn, the valve member may tend to tilt, thereby causing the solenoid core to tilt and bind in the bore of the solenoid winding or in the tube usually mounted within that bore to afford a smooth guide for the core. As far as the pressing effect of the weight of the solenoid core is concerned, this might be augmented by spacing the upright valve member laterally from the also upright core and connecting the core and the valve member respectively to relatively short and long arms of a lever, but since such connections to a lever will swing in arcuate paths whenever the lever moves, each of these connections will move transversely of the longitudinal axis of the movable part associated with it, thereby rocking the movable valve member with respect to its seat to cause leakage and also causing the solenoid core to bind in its tubular guide.

On the other hand, if the bore of the guide tube is made so large as to obviate such binding, the resulting freedom of movement is apt to cause objectionable rattling in part or all positions of the movable parts.

Moreover, any such interposing of a simple lever between the solenoid core and the movable valve member is apt to introduce difficulties in providing a suitable mounting for the pivot axis of the lever and in replacing the valve seat when the latter becomes worn.

In its general objects, my invention aims to overcome all of these objections by providing an electromagnetic valve in which the needed leverage is secured without introducing such binding, seat-wearing or rattling effects and without unduly increasing the size of the valve. Furthermore, my invention aims to provide a leverage affording valve construction which can be easily and cheaply manufactured, which will compensate for irregularities in the manufacture, and which will permit a convenient and speedy replacing of the valve seat.

Illustrative of the manner in which I accomplish the purposes of my invention and of more detailed objects thereof, Fig. 1 is a central and longitudinal section through a single lever fluid-control valve embodying my invention.

Fig. 2 is an enlarged and fragmentary horizontal section taken along the line 2—2 of Fig. 1.

Fig. 3 is an enlarged and fragmentary vertical section taken along the line 3—3 of Fig. 1.

Fig. 4 is an enlargement of portions of Fig. 1, with the movable parts in the closure position of the valve.

Fig. 5 is an enlarged perspective view of the upper portion of the pivoting post.

In the illustrated embodiment, the fluid-control valve of my invention includes a hollow and upwardly open valve body 1 having an inlet 2 at one side and an outlet 3 at its opposite sides, and having a partition 4 extending across the valve body to divide the interior of this body into an inlet chamber C and an outlet chamber O.

The part of the partition 4 near the inlet 2 is formed to afford an upright threaded bore 5 and a relatively smaller guide bore 6 disposed above the bore 5 and alining axially with the latter. Screwed upwardly into the lower portion of the threaded bore 5 is an upright plug 7 which has an axial and also upright bore 8, on the upper end of which bore 8 the downwardly tapering lower end of a plunger 9 is adapted to seat. This plunger is guided, desirably rather loosely, by the guide bore 6 and preferably is formed of a different metal than the plug 7 which affords the valve seat.

Rising from the partition 4 between the plunger 9 and the inlet 2, and desirably threaded at its lower end into the said partition is a pivoting post 10 which has its upper portion shaped to form an ear 10 A. This ear has parallel opposite upright faces and a horizontal cross-bore 10 C, and the post is mounted so that the medial plane P (Fig. 5) between the said ear faces extends along the axis of the plunger 9.

The valve body has a tubular upper end 11 which is threaded for receiving an annular downward extension 12 on a solenoid cover guide 13, which guide is integral and coaxial with a tubular core guide 14 closed at its upper end by a guide top 15. Sleeved upon this core guide 14 and desirably spaced upwardly from the cover guide 13 by insulating washers 16 is a solenoid winding 17, which in turn is sleeved by an insulating tube 18.

Slidably fitted over the insulating tube 18 and the peripheral wall of the cover guide 13 is a cover 39, which cover desirably is detachably secured to the top of the cover guide 15 by a screw 19 and insulated from that top by insulation 20.

Freely slidable within the bore of the tubular core guide 15 is a cylindrical iron solenoid core 21, which is operatively connected to the valve plunger 9 through a lever and link assemblage designed to allow for the arcuate paths in which all parts of this lever and link assemblage move, and also designed to permit both the solenoid core and the valve plunger to tilt and shift somewhat with respect to the guides associated with them.

For this purpose, the lower end of the solenoid core 21 is fastened by a screw 22 to the back 23 of a stirrup having upright and downwardly extending arms 24. These arms have the spread of their lower portions 24 A contracted (as shown in Fig. 3) to a distance only slightly greater than the thickness of an approximately upright link 25, which link has its lower end pivoted on a pin 26 extending horizontally through the said two arm portions 24A.

Interposed between the upper end of the said link 25 and the flattened ear 10 A of the riser post are two parallel and counter-part lever elements 27 and 28 which together form the lever of my valve mechanism, these companion lever elements being conjointly pivoted at one end to the riser post ear 10 A by a horizontal pivot pin 29 and to the upper end of the link 25 by a horizontal pivot pin 30.

Extending between the two lever elements 27 and 28 adjacent to the axis of the plunger guide 9 is an approximately upright third link 31 which has its upper end pivoted on a pin 32 extending through both of the said lever elements, while the lower end of this third link extends into the forked upper end of the valve plunger 9 and is pivoted to that plunger on a horizontal pin 33 extending through both of the fork arms 9 A of the said upper plunger end.

With the pivots 26, 30, 32 and 33 all parallel to each other and at right angles both to the vertical plane P (in which plane the axes of the plunger guide bore 6, the valve seat bore 8 and the solenoid core are all located), the links are permitted a tilting movement to allow for the arcuate paths of the pivot pins 30 and 32 while the lever composed of the companion lever elements 27 and 28 swings from its lowermost (valve-closing) position of Fig. 4 to its raised or valve-opening position of Fig. 1, this tilting movement being all approximately in the vertical plane P of Fig. 2.

Moreover, by allowing some play between the valve plunger 9 and its guide bore 6, and likewise between the solenoid core 21 and its tubular guide 14, I permit both the plunger and the solenoid core to shift somewhat away from the axes of their respective guides and also to tilt slightly with respect to these axes. Consequently, I entirely avoid any binding or cramping of either the solenoid core or the valve plunger with movements thereof in either direction.

In practice, I may also make each of the aforesaid four pivot pins slightly smaller than the parts through which it extends, thereby providing additional play at these pivots to compensate for irregularities in the manufacture or assembly of the various parts—as for example, for a slightly tilted threading of the lower portion of the riser post 10, or for a slight departure of the axes of the valve plunger and the solenoid core guide from the said medial plane P.

When my control valve is in use, the lifting effect of the solenoid on the valve plunger is augmented by the lever, so that a smaller current consumption is required in the winding of the solenoid. Likewise, the depressing of the plunger is similarly augmented, so as to be much greater than with a solenoid core of the same weight directly connected to the plunger, thereby effecting a firmer closing of the valve although leaving the plunger free to find its seat when the plunger is depressed.

Moreover, by making the bore of the threaded body end 11 of greater radius than the distance between the axes of the solenoid guide 14 and the riser post 10, I afford ready access to the interior of the valve body for forming the bore into which this post is threaded, and also for boring out both the plunger guide bore 6 and a port 34 which leads from the inlet chamber C of this body to the space between the said guide bore and the valve seat plug 7.

By also providing the bottom 1 A of the valve body with a threaded upright bore 35 alining with and larger in diameter than the said plug, I permit ready access for drilling and tapping the plug-receiving partition portion 5. This bottom bore 35 is normally closed by a bottom plug 36, desirably with a packing 37 interposed between the head of this bottom plug and the bottom 1 A, and when the said bottom plug is detached, the user can readily remove and replace the valve seat plug 7 if the latter becomes worn.

In practice, the partition within the hollow valve body preferably comprises three integral parts, namely a lower and generally horizontal portion 4 A extending from the inlet side of the body part way toward the opposite side at an elevation below that of the inlet bore 2 A, a riser portion 4 A freely spaced both from the outlet 3 and the stirrup 24, and an upper horizontal portion 4 C extending from the upper end of the said riser portion 4 B to the outlet side wall of the body above the bore 3 A of the outlet. Then I form the threaded bore 5, the plunger-guiding bore 6 and the post-receiving bore 36 threaded lower portion 4 A and bore the port 34 through this same portion at an angle easily reached by a drill extending through the upward opening of the valve body.

With the parts of my valve body preformed as described, the pivoting post, the lever, valve plunger and links can all be connected as a unitary assemblage to the solenoid and core assembly, and the pivoting post can be screwed into the post-receiving 36 while the remainder of the said assemblage is swung upwards, thus expediting the assembling. All parts of the solenoid excepting its core 21 can also be assembled as a unit, after which the tubular guide 14 is slid over this core and the threaded flange 13 of the solenoid assemblage is screwed into the mouth of the valve body to complete the assembly of my valve.

However, while I have heretofore described my invention in an embodiment including numerous desirable details of construction arrangement, I do not wish to be limited in these respects, since many changes might be made without departing either from the spirit of my invention or from the appended claims.

I claim as my invention:

1. In a fluid control valve, an upright valve plunger, a solenoid including an upright core having its axis spaced from the axis of the plunger, a horizontal pivoting element supported at the opposite side of the plunger with respect to the side at which the core is disposed, a lever pivoted at one end on the pivoting element and movable in the common plane of the said axes, and two links respectively connecting the core with the other end of the lever and connecting the plunger with an intermediate portion of the lever, the connections of the links to the parts between which the links are interposed being arranged to permit appreciable lost motion at the said connections.

2. A fluid control valve comprising an upwardly open hollow valve body provided with an inlet opening and an outlet opening and having a partition extending across the body between the said openings; an upright solenoid winding supported by the body, the partition being provided with a guide bore having an upright axis spaced from the axis of the said winding; a valve seat spaced downwardly from and alining with the said bore, the partition having a port leading downwardly to the space between the said seat and the lower end of the guide bore; a plunger slidable in the guide bore and adapted to engage the valve seat; a horizontal pivot pin supported at higher elevation than the plunger and extending at right angles to the common plane through the axes of the solenoid core and the guide bore, the axis of the guide bore extending between the solenoid core axis and the pivot pin; a lever pivoted at one end to the pivot pin, and links respectively connecting the other end of the lever to the solenoid core and connecting an intermediate portion of the lever to the plunger.

3. An electromagnetic fluid-control valve comprising a hollow valve body provided with an inlet and an outlet and having an upper opening, the valve body also having a partition extending across its interior between the inlet and the outlet and freely spaced both from the bottom of the body and from the said opening; the partition having a threaded bore extending upwardly into it and a relatively smaller cylindrical guide bore extending from the upper end of the threaded bore upwardly through the partition, and having a port leading from above the partition to the upper part of the threaded bore; a tubular plug threaded upwardly into the threaded bore, an upright plunger slidable in the said guide bore, a solenoid member overhanging the upper opening of the valve body and including an upright solenoid core; and a lever and link assemblage supported by the valve body and operatively connecting the solenoid core with the plunger, the said assemblage being insertible within the valve body through the said upper opening.

4. A fluid-control valve as per claim 3, in which the valve body has a bottom opening underhanging the said plug and a detachable closure member normally sealing the bottom opening, the plug being insertible and removable through the said bottom opening.

5. A fluid-control valve as per claim 3, in which the solenoid member also includes a guide member including an upright tubular portion and a larger diametered annular bottom portion, the said bottom portion being threaded into the upper opening of the valve body and the solenoid core being slidable in the said tubular portion.

6. A fluid-control valve comprising a hollow and upwardly open valve body provided with an inlet and an outlet, a partition dividing the interior of the body into an inlet chamber and an outlet chamber, the body opening leading to the said inlet chamber, and means for controlling the flow of liquid through the partition; the said means comprising a pivoting member, a solenoid core spaced from the pivoting member, a movable valve member, a lever pivoted on the pivoting member, and links respectively connecting the lever with the said valve member and with the said core; all of the said means except the solenoid core being normally within the inlet chamber, and all of the said means being adapted to be assembled as a unit exteriorly of the valve body and thereafter operatively positioned in the valve by attaching the pivoting member to the valve body.

7. An electromagnetic fluid-control valve comprising a hollow valve body provided at its opposite sides respectively with an inlet and an outlet, a partition extending across the interior of the said body from a body portion adjacent to and above the outlet to a body portion adjacent to and lower than the inlet, whereby the partition subdivides the interior of the valve body into an upper inlet chamber and a generally lower outlet chamber, the valve body having an upper opening; a solenoid assemblage surmounting the body and overhanging the said opening and including a vertically slidable solenoid core; an upright plunger extending slidably through the partition and spaced in one lateral direction from the axis of the solenoid core toward the inlet, a valve seat member carried by the partition and underhanging the plunger; a pivoting post rising from the partition at still greater spacing in the same direction from the said core axis, a lever pivoted at one end to the upper end of the said post, and two links respectively connecting the solenoid core with the other end of the lever and connecting the plunger with an intermediate portion of the lever, the lever and links being all movable in the general direction of a plane extending through the axes of both the pivoting post and the solenoid core.

8. A fluid-control valve as per claim 7, in which the upper end of the post is flattened transversely of the direction of the said spacing, and in which the lever comprises two counterpart portions between which the upper ends of the said two links extend.

9. In a fluid-control valve having an upwardly facing valve seat and a vertically movable plunger disposed above and alining substantially axially with the said seat, means for actuating the plunger, comprising: a solenoid supported at higher elevation than the top of the plunger and including an upright core having its axis spaced laterally from that of the plunger; an inverted U shaped stirrup secured to the lower end of the core, a link extending between the shanks of the stirrup and pivotally connected at its lower end to both of the said shanks for movement about a horizontal axis; a lever pivoted at one end on an axis stationary with respect to the valve seat and spaced further from the core axis and in the same direction from the latter than the plunger axis, the lever being pivoted at its other end to the upper end of the said link; and a second link having its lower end pivotally connected to the plunger and its upper end pivotally connected to an intermediate portion of the lever.

10. In a fluid control valve, an assemblage as per claim 9, in which the lower end portions of the shanks of the stirrup extend close to opposite faces of the lower end of the first named link, and in which the portions of the said shanks opposite the connection of the lever to the first named link are at a considerably wider spacing from each other.

Signed at Cleveland, Ohio, June 28, 1932.

LEE B. GREEN.